Aug. 1, 1939.   A. BOUSSEL   2,168,114
REMOTE CONTROL FOR AUTOMATIC FIREARMS
Filed June 24, 1936   6 Sheets-Sheet 5

Fig. 20

Patented Aug. 1, 1939

2,168,114

UNITED STATES PATENT OFFICE 2,168,114

REMOTE CONTROL FOR AUTOMATIC FIRE-ARMS

André Boussel, Courbevoie, France, assignor to Societe Anonyme des Anciens Etablissements Hotchkiss & Cie., Levallois-Perret, Seine, France, a joint-stock company of France Application June 24, 1936, Serial No. 87,065
In France July 9, 1935

19 Claims. (Cl. 89—1)

The present invention concerns the construction of a central control station from which the gunner can control one or a plurality of machine guns or other automatic firearms, i. e., the trigger of said firearms as well as the operations of placing it in the safety position, recocking and the like.

The actuating and control station according to the invention, is essentially characterised by the fact that it comprises means whereby the various operations are interdependent on each other, in this respect that any of said operations can only be effected if any one or more other operations have been previously effected, thereby rendring the apparatus fool-proof.

This control of the various operations can be ensured by a lever which corresponds to one or a plurality of firearms and which can be successively brought into a number of positions for each of which, by acting on distributing or selecting members, it effects or permits the control of certain operations, whereas it makes the others impossible.

The various control levers corresponding to the various firearms or groups of firearms are placed on a central panel from which the gunner can, prior to any firing, place in the firing position only the arms which he considers it opportune to fire.

A plurality of firearms or groups of firearms each placed under the control of a separate control lever, can furthermore be placed under the control of a common control lever, so that by the sole operation of said lever all or a portion of the firearms or groups of firearms in question can be controlled.

Pilot lamps placed on the control panel show at all times the position of operation of the corresponding firearms.

The construction of each control lever and of the associated members on which it acts for controlling the safety and the other operations, can vary to a fairly great extent, according to the particular conditions of use.

According to the invention each lever corresponding to one or a plurality of firearms, on the one hand, controls the circuit operating the trigger of said firearms, and on the other hand acts on the circuit or circuits effecting the other operations, as for example the safety control circuit, so that the actuation of the trigger is only possible if the control lever has brought said firearms from the safety position to the firing position.

Other characteristics and peculiarities of the invention will become apparent from the ensuing description taken in conjunction with the accompanying drawings which show diagrammatically and merely by way of example various embodiments of the invention. In said drawings:

Fig. 1 is a diagrammatic elevational view of a unitary hand lever according to the invention.

Figs. 2 and 3 are elevations showing diagrammatically two modified embodiments of said hand lever.

Fig. 4 is a longitudinal vertical section through a selector for a machine gun having an electrically actuated trigger.

Fig. 5 is a longitudinal vertical section through a selector for a machine gun having a trigger actuated by a fluid under pressure.

Fig. 6 is a diagram of the fluid conduits for such an application.

Fig. 7 is a side elevation partly in section of a modification of construction of the fluid pressure selector.

Fig. 8 is an elevation partly in section of a mechanical selector.

Fig. 9 is a fragmentary top plan of the link in Fig. 8.

Fig. 11 is a side elevation partly in section of a modification of the distributor for the control of said recocking.

Figs. 12 and 13 are vertical longitudinal sections of two other modifications of said distributor.

Fig. 14 is a vertical transverse section taken through the left end of the push rod in Fig. 13.

Fig. 15 is a diagrammatic elevation partly in section of a modified embodiment of the invention, according to which the safety lock is controlled by a fluid under pressure.

Fig. 16 is a fragmentary elevation of an arrangement of control station for machine guns, providing for a plurality of preparatory operations.

As has been broadly explained in the preamble, the object of the present invention is to enable one or a plurality of machine guns or other automatic firearms to be controlled from a central station, arrangements being provided to prevent any incorrect operation, to avoid for example actuating the trigger when the firearm is in the safety position. As a particular aplication, there may be mentioned for example the case of a plurality of machine guns mounted on various parts of an aeroplane or other aerial machine and which are controlled by the pilot or an observer who has on a panel placed in front of him one or a plurality of control levers, in accordance with those provided by the invention.

Where a number of guns, especially machine guns, are to be controlled from a central station, it is usual to provide a common or general firing control device adapted to operate the triggers or other firing means on the guns through selectors, the object of the latter being to make said general control device effective only in respect of the desired guns. On the other hand, said guns are frequently so arranged that they are normally in a state of unreadiness for firing, so that they have to be brought into a state of readiness preparatory to being fired; e. g. they may have a safety lock which has to be withdrawn in order to allow the sear to be depressed. In such instances, it is necessary, before selecting a gun to be fired, to bring same into a state of readiness, that is, to cause its corresponding mechanisms to operate. Therefore, it is desirable, and the object of this invention is, to provide an arrangement in which only those guns which are in a state of readiness can be selected for firing; furthermore, in which preparation and selection of a gun unit occurs through a single control, and then, in which preparation with selection of different gun units is controlled severally, whereas firing all of same is controlled by a single control.

Figure 20:
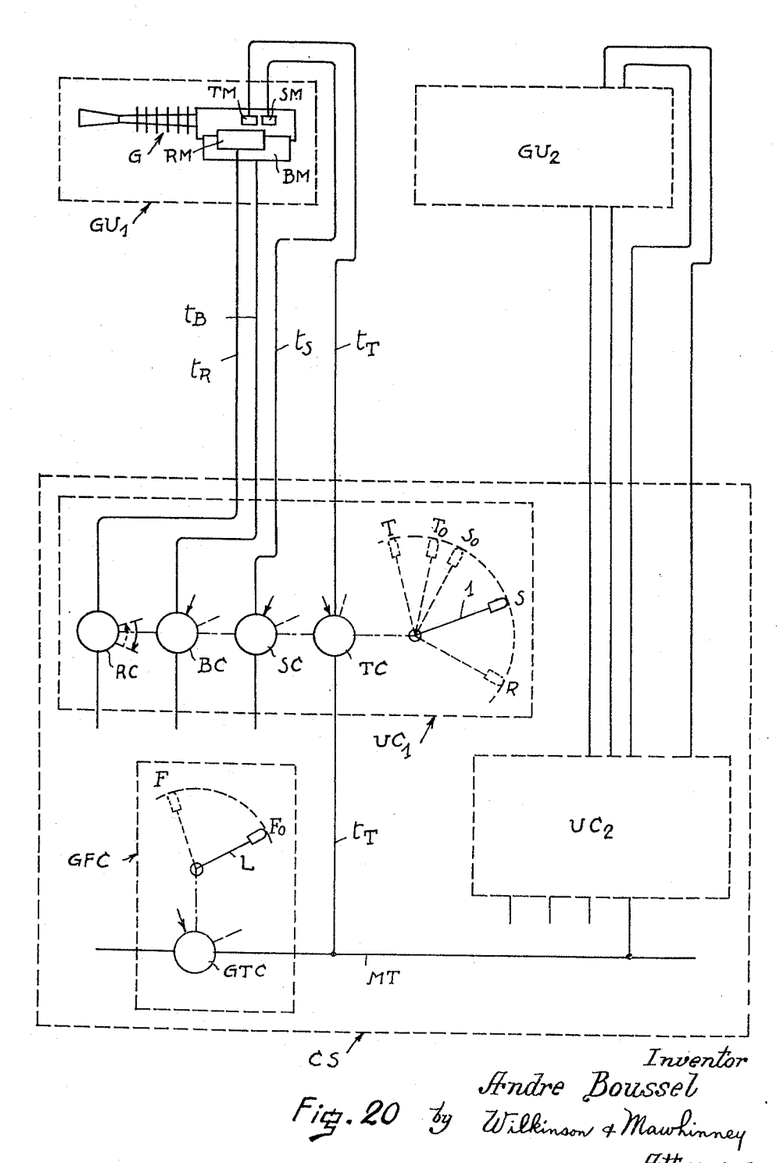
Fig. 20 is a diagrammatic view of a control arrangement according to the invention.

Referring to Fig. 20 of the drawings, there may be a number of gun units $GU_1$, $GU_2$, either similar or different, and comprising one or more machine or other guns G. In the embodiment shown, the gun unit $GU_1$ comprises one machine gun G, having mechanisms, such as servo-motors TM, SM and RM, for actuation of the trigger, a safety lock and the recocking bolt, respectively, and a pneumatic recoil brake BM. Said mechanisms are all to be operated from a central station, generally shown at CS, for which purpose they are connected thereto by suitable transmissions, as $t_T$, $t_S$, $t_R$ and $t_B$, respectively.

Central station CS comprises unit controls $UC_1$, $UC_2$, one for each gun unit $GU_1$, $GU_2$, respectively; and a general fire control GFC. Considering the unit control $UC_1$ for the gun unit $GU_1$ described above, said unit control comprises a unitary handle I, operatively connected to control devices TC, SC, BC and RC, for transmissions $t_T$, $t_S$, $t_B$ and $t_R$ respectively. Handle I normally assumes a position designated by S, in which position the gun unit must be unprepared, the safety lock being engaged to prevent firing and the recoil brake being empty or ineffective. From said position S, said handle I can be moved into a position T, in which latter the gun unit must be prepared or in a state of readiness, that is with its safety lock retracted and its recoil brake filled with compressed air. Further, in position S of handle I, the gun unit must be disconnected from the general control GFC, whereas it must, on the contrary, be connected thereto or selected to be fired thereby, in position T of said handle I. Therefore, parts SM, BM, $t_S$, $t_B$, SC and BC are so arranged that operation of mechanisms SM, BM, i. e. bringing them into readiness for firing, positively depends on the handle I being moved into position T, whereas their return into a state of unreadiness positively depends on said handle being in position S, and parts TM, $t_T$ and TC are so arranged that transmission $t_T$ is ineffective or effective for the trigger mechanism to be operated by control GFC, according as handle I is in position S or T, respectively. Preferably, the arrangement is such that control devices SC, BC are brought into operative position before the control device TC is moved out of its inoperative position, so as to cause the respective preparatory operations to be effected as the handle I reaches its position T. For instance, devices SC and BC are moved from their inoperative position, shown by dotted lines, into their operative position, shown by arrows, when handle I moves from position S to a position $S_0$, and TC moves from inoperative into operative position, similarly shown by a dotted line and an arrow, respectively, when handle I further moves from a position $T_0$ into position T. Various embodiments of said controls and transmissions, viz. mechanical, pneumatic and electrical, will be described in detail with reference to Figs. 1 to 19.

Referring again to Fig. 20, control GFC comprises a general firing lever L and, operatively connected thereto, a control device GTC, adapted to control a main transmission MT, the several trigger transmissions $t_T$ being connected to the latter as branch transmissions. The nature and arrangement of device GTC is such that when level L is in position $F_0$, main MT is in a state of rest, whereas in position F of said lever, said main is so operated or energized as to operate the triggers in those gun units which have been selected, the transmission $t_T$ to which having been made effective by the respective handle I having been moved into position T. Devices of such nature and arrangement are conventional.

The recocking mechanism and its associated parts require to be particularly considered. While the state of either readiness or unreadiness of mechanisms such as a safety lock or a recoil brake can be rendered wholly dependent on the position of handle I or positively controlled thereby, the state of a mechanism such as the recocking mechanism depends on the operation of the gun. From another standpoint, operation of a mechanism such as a safety lock may be termed a normal preparatory operation, whereas operation of a mechanism such as a recocking mechanism may be termed an accidental preparatory operation. So as to meet such particular requirements of mechanism RM, unitary handle I is further adapted to assume a position R, which is beyond the position S as viewed from position T, so that said handle can only reach position R when the respective gun unit is otherwise unprepared and not selected for firing. Correspondingly, control device RC is so constructed and related to handle I that it is operated when said handle is in position R. However, the gun is not ready for firing while the recocking mechanism is thus being operated, and the latter must be caused to return into a state of rest, which is effected by moving handle I back to position S. Thereupon, handle I can be further moved into position T to select the gun to be fired. Embodiments of parts $t_R$, RC of such nature and arrangement or relation will be described with reference to Figs. 1 to 19, the recocking mechanism RM being a conventional one.

A unitary hand lever according to the invention is shown in 1, Fig. 1. Said lever 1 can pivot about a fixed pin 2. It controls through a flexible cable 3, the safety lock 4 of a machine gun M. Said cable 3 is fixed at 5 on the lever 1. When said lever 1 occupies the firing position, shown at T in full lines, the cable 3 holds the lock 4 in the retracted or firing position (position shown in full lines). When the lever 1 is swung in the direction of the arrow f into the safety position S, the cable 3 no longer retains the lock 4 in its retracted position, the latter is then brought, by a spring 6 or any other equivalent member into the safety position (position shown in dotted lines) in which the firearm M can no longer fire. To replace said firearm M in the firing condition, it suffices to bring the lever 1 from the position S to the position T. At $S^1$ the position has been shown, up to which the safety is ensured and at $S^2$ the position in which the lever passes over the dead centre so that the spring 6 automatically holds the lever 1 in the firing position T. It will be noted moreover that said lever 1 can be held stationary both in the position S and in the position T by any appropriate means, for example by a spring-pressed dog or an interlocking device, as is well known.

In the modification of Fig. 2 the arrangement is reversed in that the lever 1 positively controls the placing of the lock 4 in the safety position, whereas the spring 6 urges said lock to the firing position. This reversal is simply obtained by modifying the position of the fulcrum 7 of the lock 4 and of the point of connection 5 of the cable 3 on the lever 1.

In the modification of Fig. 3, the spring 6 is eliminated and is replaced by a second cable 3a. When the lever 1 is displaced in the direction of the arrow, the cable 3 brings the lock 4 to the safety position. When the lever 1 is displaced in the opposite direction, the cable 3a brings said lock 4 back into the firing position.

The unitary lever 1 also depresses, when it is in the firing position, the push rod 8 of a selector 9 which is interposed in the actuating circuit of the trigger of the machine gun M. That is to say that said selector 9 only enables the trigger to be actuated by the main firing handle, which is not shown, when the lever 1 is in the firing position. Of course, the construction of said selector depends on the arrangement adopted for the fire control of the machine gun M. If it is assumed, for example, that the trigger is controlled by means of an electric circuit, the selector 9 is a switch 10 (see Fig. 4) interposed in said circuit. Said switch 10 is in the closed position when the push rod 8 is depressed by the lever 1; it is held in the open position by the spring 11 in the opposite case. The actuation of the trigger can therefore only be obtained, by acting on the usual main handle (not shown), only on condition that the unitary lever 1 has been previously brought into the firing position and thus caused to retract the safety lock.

If it is assumed, on the contrary, that the control of the trigger is effected by a pressure fluid, the selector 9 takes (see Fig. 5) the shape of a valve 12 which, when the push rod 8 is not depressed by the lever 1, closes the branch pipe 13. On the contrary, when the push rod 8 is depressed, said valve 12 opens said pipe.

In order that the invention shall be better understood, a pneumatic control circuit for the trigger of a plurality of machine guns has been shown diagrammatically in Fig. 6. In this diagram the compressed air pipe is shown at 14 and it has been assumed that the central control distributor 15 is mounted on the usual control column 16 of an aerial machine. When the pilot acts on the control handle 17 for firing, the pipe 14 is placed in communication with the pipe 13 on which are mounted in parallel the various selectors 9, 9a, 9b, etc., corresponding respectively to each of the machine guns $M^1$, $M^2$, $M^3$, etc. If all the levers 1 corresponding to all said machine guns have been previously brought into the firing position, all the machine guns will come into action because all the selectors will have been brought by their corresponding push rod 8 into the position in which the valve 12 is open. On the contrary, if only certain levers 1 have been brought into said firing position, only the corresponding machine guns will come into action.

In Fig. 7 a modified construction of the fluid pressure selector has been shown. According to this modification, the valve 12 is replaced by a rotary distributor 12a which rotates with the lever 1 and which according to the position of the latter places the two sections of the pipe 13 in communication or cuts off the communication between them.

A mechanical embodiment of the selector 9 can also be provided. It is such an embodiment which is shown in Figs. 8 and 9. In this case, the selector consists of a lever 18 pivotally mounted at 19 on one of the parts 20 of the mechanical control of the trigger of the machine gun. When the push rod 8 is not depressed by the corresponding lever 1, said lever 18 occupies the position shown in dotted lines in Fig. 8 and when the transmission 20 is operated to actuate the trigger, the movement is not transmitted to the member 20a connected to the trigger which will therefore not be actuated. If, on the contrary, the push rod 8 is depressed it causes the lever 18 to rock, the end 18a of said lever engages the slot 21 of the member 20a which is thus kinematically connected to the transmission 20, so that the trigger can be actuated. As is seen more particularly in Fig. 9, the lever 18 is engaged in an opening provided in the plate 8a secured to the push rod 8.

Figure 10:
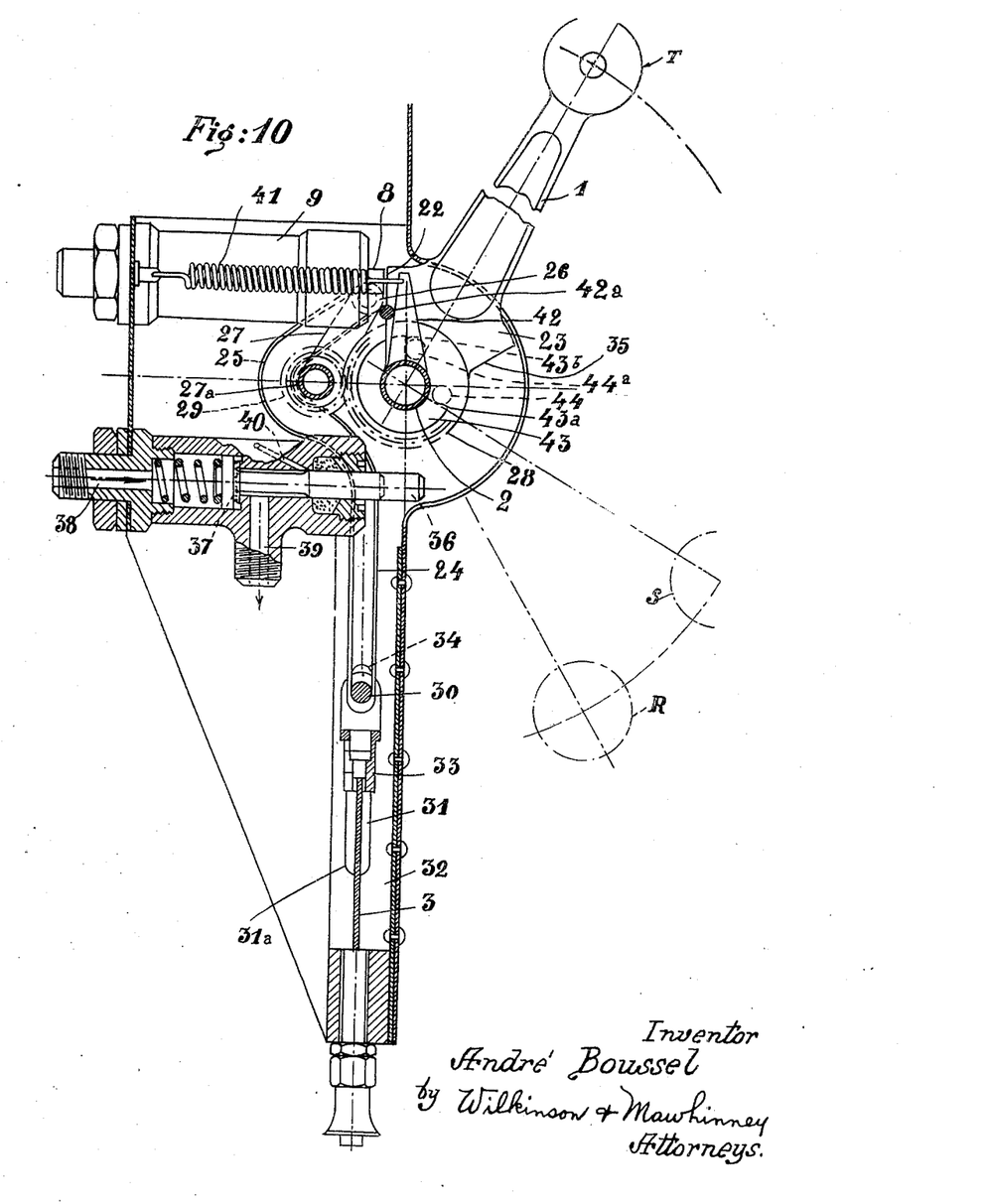
Fig. 10 is a side elevation partly in section of a complete embodiment of a unitary hand lever for a control station according to the invention, with control of the recocking.
Figures 17, 19:
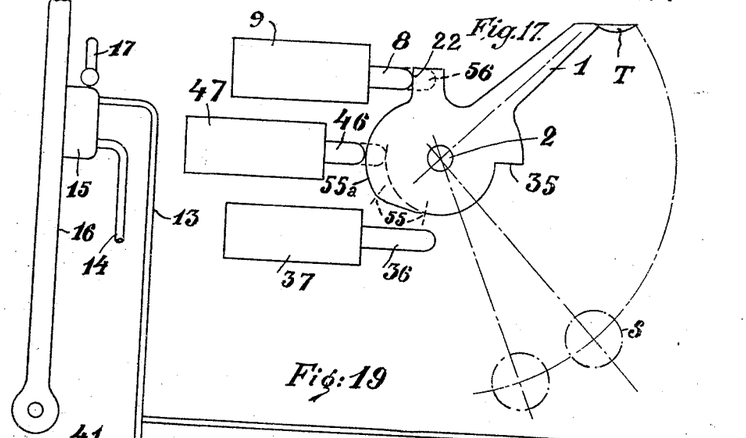
Fig. 17 is a side elevation of a unitary lever for such an application.
Fig. 19 is an elevation of the fluid conduits for such an application.
Figure 18:
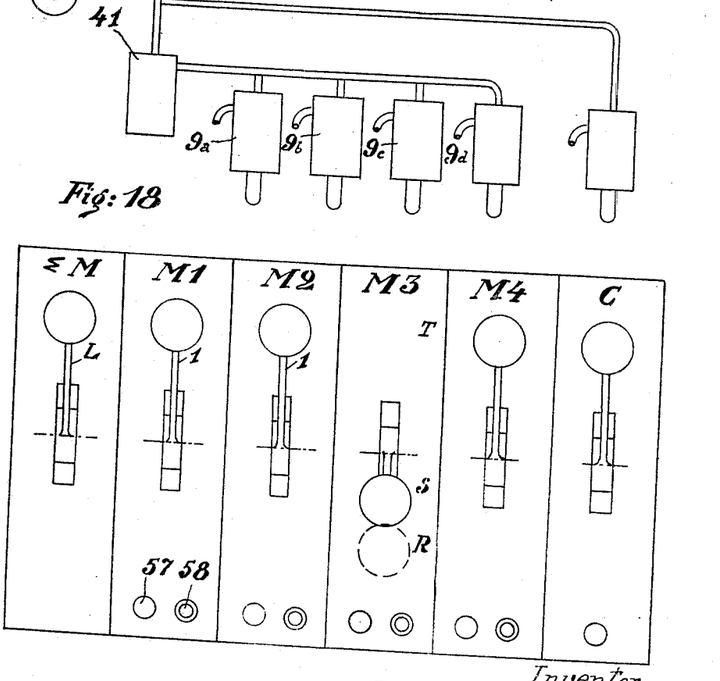
Fig. 18 is an elevation of a station providing for a group control of a plurality of machine guns and a gun.

In Fig. 10 a more complete embodiment has been shown of the unitary control lever according to the invention. In said figure the selector 9 is found with its push rod 8 which is actuated by the face 22 of a segment 23 secured to said lever 1. In this embodiment, the flexible cable 3 of Fig. 1 is connected to the lever 1 by a connecting rod 24. Said connecting rod is not directly pivoted on the lever 1 but an arrangement is provided to amplify its movement. For this purpose, said connecting rod 24 is pivotally connected at 26 to a crank 27 pivoting about the pin 27a and the angular movements of which are controlled by the lever 1 through a toothed segment 28 rotating with said lever and driving a pinion 29 secured to the crank 27. In the example shown, the amplitude of the movement of the crank 27 is double the amplitude of the movement of the lever 1. The connecting rod 24 is suitably curved at 25 to permit it to follow the crank 27 beyond dead centre and to escape the pin 27a on which the crank pivots. The small end 30 of the connecting rod 24 consists of a pin which is guided in its vertical movement by slides 31 provided in the fixed part 32 of the device. To said small end 30 is connected the end 33 of the cable 3 actuating the safety lock 4, as shown in Fig. 1.

When the lever 1 is in the safety position S, the connecting rod 24 is in the low position in which its small end 30 abuts at 31a against the lower end of the slides 31. The connecting rod 24 can, however, descend a certain additional amount owing to the fact that it has an ovalised hole 34 in which the pin 30 can move. This additional movement of the connecting rod 24 enables the lever 1 to be brought into the position R in which is operates the recocking of the machine gun or machine guns. In this position, the face 35 of its segment 23 acts on the push rod 36 of the fluid distributor, the valve 37 of which is then brought into the open position in which the pressure fluid which arrives by the pipe 38 can flow freely through the pipe 39 to the pneumatic motor controlling the recocking, which motor can be of any appropriate known type. When the valve 37 is in the closed position, the pipe 39 communicates with the atmosphere by the ducts 40, so that the pneumatic recocking motor is itself in communication with the atmosphere, as is necessary. On the contrary, when the valve 37 is in the open position, said ducts 40 are closed by the push rod 36 itself. During the whole operation of recocking, the connecting rod 24 and consequently the safety lock 4 are held in the safety position, owing to the ovalised hole 34 which permits the pin 30 to remain pressed against the abutment 31a.

A spring 41 acts on the end of an arm 42 to which is secured a segment 43. An abutment 44, secured to the lever 1, engages a face 43a of said segment 43 when said lever is brought into the safety position S or further into the recocking position R. Thereby, said spring 41 urges said lever from the recocking position into the safety position. The assembly 42—43 is retained by the fixed abutment 42a in the position corresponding to the safety position of lever 1, so that when the latter is further moved to the firing position T, it is no longer subjected to the action of said return spring 41. In said firing position, the abutment 44 comes into 44a and is stopped by the face 43b of the segment 43.

Figs. 11 to 14 show two modifications of construction of the distributor controlling the recocking. In the modification of Fig. 11, the valve 37 is replaced by a rotary distributor 37a which rotates with the lever 1. When said lever 1 is brought into the recocking position R said distributor 37a places the pipes 38 and 39 in communication (compare with Fig. 10). On the contrary, from the safety position and in all the positions beyond, said distributor 37a places the pipe 39 in communication with the pipe 40 which is open to the atmosphere.

In the embodiment of Fig. 12, the distributor consists of a slide valve 37b which, when the push rod 36 is depressed (corresponding to the recocking position of R of the lever 1) places the pipe 38 in communication with the pipe 39; when the push rod 36 is not depressed (position shown) the pipe 39 communicates with the pipe 40 which is open to the atmosphere.

Finally in the embodiment of Figs. 13 and 14, a valve 37 is found which is similar to the valve of Fig. 10, but in this case said valve is actuated by the push rod 36 with a certain play 45, by means of which the valve 37 only begins to open when the exhaust pipes 40 are completely closed.

All these embodiments are moreover given by way of examples, it being understood that many others can be contrived.

In all the previously described examples, the lever 1 directly actuates the safety lock 4, either through the instrumentality of a cable 3 or through the instrumentality of a connecting rod 24. However the pneumatic control of said safety lock 4 could be provided. This is what has been shown in Fig. 15. The lever 1 in this case not only actuates the push rod 8 of the selector 9 of the trigger circuit, but also the push rod 46 of a distributor 47 of the pressure fluid. When the lever 1 begins to be actuated in the direction of the arrow (Fig. 15) it depresses first of all the push rod 46 by means of which the compressed air which arrives through the pipe 48 flows through the pipe 49 to a pneumatic motor generally designated by 50, and which can be of any appropriate known type, for example, having a fixed piston 51 and a movable cylinder 52. Said cylinder acts on the lock 4 which it then holds in the firing position. If the action is continued on the lever 1, it then acts on the push rod 8 to enable the trigger to be actuated. When he lever 1 is brought back into the safety position, for example the position shown, the communication is cut off between the pipes 48 and 49, the air no longer arrives in the pneumatic motor 50 and the spring 6 brings the lock 4 back into the safety position.

The invention can be applied to the actuation of any other controls. If, for example, the machine guns are adapted to recoil when firing and have recoil brakes filled with compressed fluid, an additional distributor can be provided actuating or controlling the circuit of said brakes. In Fig. 16 a diagram has been shown in which the lever 1 successively actuates first of all the distributor 53 of the brake circuit, the distributor 47 of the pneumatic control circuit for feeding the safety device, the selector 9 of the trigger control circuit and finally, a distributor or selector 54 connected to any other circuit of which the use may be contemplated. In order to make the apparatus foolproof, these operations must take place in a definite order and the length of the push rod corresponding to the various distributors and selectors must be calculated accordingly. If the arrangement shown in Fig. 16 is adopted, it is obviously necessary to give the push rod of the first selector 53 a much longer stroke than the stroke necessary. In order to avoid this drawback, the embodiment shown in Fig. 17 can be advantageously adopted. In this example, in addition to the distributor 37 controlling the recocking, there have only been shown the distributor 47 of the safety device and the selector 9 of the trigger but it is obvious that this arrangement can be applied whatever be the number of selectors or distributors actuated by the lever 1. According to this embodiment, the lever 1 is secured to a cam 55 which, when the lever 1 is moved from the position S to the position T, effects first of all, by means of its eccentric portion 55, the displacement of the push rod 46. Said eccentric portion 55 is followed by a concentric portion 55a, which during the end of the movement of the lever 1 which is necessary for the abutment 56 to actuate the push rod 8, holds said push rod 46 in the depressed position without increasing its stroke.

According to the invention, unitary controls, as described hereinbefore, of a plurality of machine guns or any other automatic firearms can be grouped in any appropriate arrangements. Thus in the example of Figs. 18 and 19, it has been assumed that the station according to the invention controls four machine guns $M^1$, $M^2$, $M^3$ and $M^4$ and a gun C. There therefore exists a unitary lever 1 for each of these firearms. However, a plurality of machine guns can be grouped so that at a given time it is not necessary, when it is desired to start firing, to operate all the corresponding unitary levers. In the example shown all the machine guns are grouped together in that in addition to the four unitary levers 1 corresponding to each of said machine guns there is provided a group lever L actuating a group selector 41 (see Figure 19) operating in series with the unitary selectors 9ª etc. Under these circumstances, if it is desired, for example, to fire with three machine guns $M^1$, $M^2$ and $M^4$, the three corresponding unitary levers will be brought beforehand into the firing position, whereas the unitary lever corresponding to the machine gun $M^3$ will be left in the safety position. Under these circumstances, when it is desired to start firing, it will not be necessary to operate three levers but only the lever L.

In order to facilitate the control, the levers 1 will be displaceable with respect to dials bearing the necessary indications, such as: firing, safety, recocking.

The control can be further facilitated by providing for each machine gun one or a plurality of pilot lamps such as 57 and 58. The lamp 57 will, for example, be lighted when the corresponding machine gun is in the cocked position; the lamp 58 will light when the machine gun is not cocked. Said pilot lamps which are of different colours can be operated by any appropriate contactor. An embodiment of said contactor is shown by way of example in Fig. 15. It consists of a lever 59 swinging about a pin 60. When the machine gun M is in the cocked position, the face 61 of its mechanism acts on the nose 62 of the lever 59 and closes the contact 63 corresponding to the lamp 57 which is therefore lighted. When on the contrary the machine gun is displaced forwardly and is no longer cocked, the spring 64 brings the lever 59 into the position in which it is the contact 65 which is closed and the lamp 58 lighted.

It is moreover obvious that the invention has only been described and illustrated herein in a purely explanatory and in no way limitative manner and that modifications of detail can be made therein without altering its scope.

I claim:

1. A control device for a machine gun having a fluid pressure recoil brake, comprising a swingable handle provided with a cam and adapted to assume an unprepared position, a fire selecting position at one side of same and a recocking position at the other side of same; a fluid pressure recocking mechanism, a conduit for feeding same, a spring closed valve in said conduit and adapted to be depressed by said handle cam in recocking position of said handle for causing said mechanism to recock the gun; a safety lock for the gun, a fluid pressure servo-motor for retracting said lock, conduits for feeding said servo-motor and said recoil brake, spring closed valves in the last said conduits and adapted to be depressed by said handle cam as said handle passes from unprepared position to fire selecting position for causing said servo-motor to retract said lock and for filling said recoil brake; a fluid pressure trigger servo-motor, another conduit for feeding same, a spring closed selecting valve in said other conduit and adapted to be depressed by said handle cam in fire selecting position of said handle, a main conduit for feeding said other conduit, a firing valve in said main conduit and thus acting in series with said selecting valve, and a firing lever adapted to open said firing valve, thereby causing said trigger servo-motor to fire the gun when said handle is in fire selecting position and thus after the safety lock has been retracted and the recoil brake has been filled and when the gun is not being recocked.

2. In a station for remote control of a plurality of machine gun units provided with fluid pressure trigger servo-motors fed through a main conduit controlled by a general firing valve at the station and branch conduits connecting said main conduit to the respective servo-motors, safety locks operated by other fluid pressure servo-motors fed through other conduits, fluid pressure recoil brakes fed through further conduits and fluid pressure recocking mechanisms fed through still further conduits, a swingable handle at the station for each gun unit, having a cam and adapted to assume an unprepared position, a fire selecting position at one side of same and a recocking position at the other side of same, spring closed recocking valves in said still further conduits and adapted to be depressed by the respective handle cams in recocking position of said handles for causing the respective recocking mechanisms to recock the guns, unlocking and brake filling spring closed valves in said other and further conduits, respectively, and adapted to be depressed by the respective handle cams as the respective handles pass from unprepared position to fire selecting position for causing said other servo-motors to retract the respective safety locks and for filling the recoil brakes, and spring closed selecting valves in said branch conduits and adapted to be depressed by the respective handle cams in fire selecting position of the respective handles to select the respective gun units for being fired upon opening of the general firing valve and after the respective safety locks have been retracted and the respective recoil brakes have been filled and when the respective recocking mechanisms are not operating.

3. A control device for a machine gun having a fluid pressure recoil brake, comprising a handle adapted to assume an unprepared position and a fire selecting position, a safety lock for the gun, a fluid pressure servo-motor for retracting said lock, conduits for feeding said servo-motor and said recoil brake, valves in said conduits and adapted to be so controlled by said handle that they are opened as the latter passes from unprepared position to fire selective position for causing said servo-motor to retract said lock and for filling said recoil brake; a fluid pressure trigger servo-motor, another conduit for feeding same, a selecting valve in said other conduit and adapted to be so controlled by said handle that it is opened when the latter is in fire selecting position; a main conduit for feeding said other conduit, a firing valve in same and thus acting in series with said selecting valve, and a firing lever adapted to open said firing valve, thereby causing said trigger servo-motor to fire the gun when said handle is in fire selecting position and thus after the safety lock has been retracted and the recoil brake has been filled.

4. In a station for remote control of a plurality of machine gun units provided with fluid pressure trigger servo-motors fed through a main conduit controlled by a general firing valve at the station and branch conduits connecting said main conduit to the respective servo-motors, safety locks operated by other fluid pressure servo-motors through other conduits and fluid pressure recoil brakes fed through further conduits, a handle at the station for each gun unit and adapted to assume an unprepared position and a fire selecting position, unlocking and brake filling valves in said other and further conduits and adapted to be controlled by the respective handles so that unlocking and brake filling valves in a unit are opened as the corresponding handle is passed from unprepared position into firing position for causing said other servo-motors to retract the safety locks and for filling the recoil brakes in the gun unit, and selecting valves in said branch conduits annd adapted to be controlled by the respective handles so that each selecting valve is opened when the corresponding handle is in fire selecting position to select the corresponding gun unit for being fired upon opening of the general firing valve and after the corresponding safety locks have been retracted and the corresponding recoil brakes have been filled.

5. Remote control means for a plurality of automatic firearms with safety and recocking mechanisms, comprising fluid operable trigger actuating means for each firearm, a source of energized fluid including a general control valve, a connection between said source and each of said trigger actuating means, a slidable valve in each of said connections, said valve biased to closed position and having a stem extending outwardly, a rotatable handle for each firearm, each of said slidable valves being mounted adjacent the respective handle, a face on each of said handles located to press the end of said valve stem in one position of the rotatable handle to open said valve to connect the particular actuating means with said source, a fluid operated safety retracting mechanism for each firearm, a slidable valve for each safety control urged to closed position and having an outwardly extending stem and mounted adjacent the control handle for the respective gun, a cam face on each handle to press the latter stem to open the safety control valve to operate the safety mechanism to retract the safety lock, said cam face being located on said handle to hold the safety control valve open when the handle is moved to open the valve to connect the trigger actuating means with the fluid source, a fluid operable recocking mechanism for each firearm, a slidable valve for each recocking mechanism urged to closed position and having an outwardly extending stem, said last named valve being mounted adjacent the respective control handle, a face on each handle located so as to press the stem of the last named valve to open said valve and recock the respective firearm, said face and last named valve being located relatively to the previously mentioned valves and faces so that the recocking valve can be opened only when the safety retracting mechanism valve is closed and the trigger actuating valve is likewise closed.

6. A control device for a machine gun, comprising a handle adapted to assume a safety position, a fire selecting position at one side of same and a recocking position at the other side of same, a fluid pressure recocking mechanism, a conduit for feeding same, a valve in said conduit and adapted to be so controlled by said handle that it is opened when said handle is in recocking position for causing said mechanism to recock the gun; a safety lock for the gun, a fluid pressure servo-motor for retracting said lock, another conduit for feeding said servo-motor, another valve in the last said conduit and adapted to be so controlled by said handle that it is opened as the latter passes from safety position to fire selecting position for causing said servo-motor to retract said lock; a fluid pressure trigger servomotor, a further conduit for feeding same, a selecting valve in said further conduit and adapted to be so controlled by said handle that it is opened when the latter is in fire selecting position, a main conduit for feeding said further conduit, a firing valve in same and thus acting in series with said selecting valve, and a firing lever adapted to open said firing valve, thereby causing said trigger servo-motor to fire the gun when said handle is in fire selecting position and thus after the safety lock has been retracted and when the gun is not being recocked.

7. In a station for remote control of a plurality of machine gun units provided with fluid pressure trigger servo-motors fed through a main conduit controlled by a general firing valve at the station and branch conduits connecting said main conduit to the respective servo-motors, safety locks operated by other fluid pressure servo-motors fed through other conduits and fluid pressure recocking mechanisms fed through further conduits, a handle at the station for each gun unit and adapted to assume a safety position, a fire selecting position at one side of same and a recocking position at the other side of same, recocking valves in said further conduits and adapted to be controlled by the respective handles so that they are opened when said handles are in recocking position for causing the respective recocking mechanisms to recock the guns, unlocking valves in said other conduits and adapted to be controlled by the respective handles so that they are opened as the latter pass from the safety position to fire selecting position for causing the other respective servo-motors to retract the locks; and selecting valves in said branch conduits and adapted to be controlled by the respective handles so that they are opened when the latter are in fire selecting position to select the respective gun units for being fired upon opening the general firing valve and after the respective safety locks have been retracted and when the respective recocking mechanisms are not operating.

8. Selective remote control means for a plurality of machine guns having safety locks, fluid operated recoil brakes and recocking mechanisms, comprising a plurality of unitary control handles each for a unit of at least one machine gun, means operable by each handle for retracting the safety lock of the respective gun unit, means operable by each unitary control handle for controlling the admission of fluid to the recoil brake of the respective gun unit, means also operable by each handle for recocking the respective gun unit, further means operable by each handle to prevent the respective gun unit from firing until the safety lock has been retracted and also to prevent firing of the unit during recocking and a main firing device operable to fire all the units, said further means connecting the firing mechanism of the respective unit to said firing device and permitting the firing of the respective unit only when the gun is not being recocked, only when said means for controlling admission of fluid to the recoil brakes has been operated to admit fluid to said brakes and only after the safety lock has been retracted.

9. A device for controlling from a remote station a plurality of machine gun units having pressure fluid trigger servo-motors, safety locks and mechanisms for actuating same and for effecting thereon another operation preparatory to firing, comprising a plurality of handles at the station, each for controlling a gun unit and adapted to assume an unprepared position and a fire selecting position, transmissions for operating said mechanisms, control devices at the station for said transmissions and adapted to be so controlled by said handles that the safety locks are retracted and the other preparatory operations are effected in a gun unit as the respective handle passes from unprepared position to fire selecting position, a main conduit at the station for feeding the trigger servo-motors, a general firing valve in said conduit, branch conduits from said main conduit to the trigger servo-motors, and selecting valves in said branch conduits and adapted to be so controlled by said handles that the branch conduits to gun units are opened when the respective handles are in fire selecting position, thereby to select for being fired upon opening the general firing valve the units in which the safety locks have been retracted and the other preparatory operations have been effected.

10. A device for the control from a remote station of a plurality of machine gun units provided with mechanisms for effecting thereon operations preparatory to firing, comprising a plurality of handles at the station, each for controlling a gun unit and adapted to assume an unprepared position and a fire selecting position, transmissions for operating said mechanisms, control devices at the station for said transmissions and adapted to be so controlled by said handles that said mechanisms are caused to effect said preparatory operations in a gun unit as the respective handle passes from unprepared position to fire selecting position, a general firing device at the station, operating connections from said firing device to the gun triggers, and selectors in said connections and adapted to be so controlled by said handles that the connections to gun units are made operative when the respective handles are in fire selecting position, thereby to select for being fired upon actuation of the general firing device the gun units in which said preparatory operations have been effected.

11. A device for controlling from a remote station a plurality of machine gun units provided with fluid pressure servo-motors for effecting thereon an operation preparatory to firing, comprising a plurality of handles at the station, each for controlling a gun unit and adapted to assume an unprepared position and a fire selecting position, conduits for feeding said servo-motors, valves at the station in said conduits and adapted to be so controlled by said handles that the servo-motors are caused to effect said preparatory operation in a gun unit as the respective handle passes from unprepared position to fire selecting position, a general firing device at the station, operating connections from said device to the gun triggers, and selectors in said connections and adapted to be so controlled by said handles that the connections to gun units are made operative in fire selecting position of the respective handles, thereby to select for being fired upon actuation of said firing device the gun units in which said preparatory operation has been effected.

12. A remote control means for a plurality of automatic firearms having safety and recocking mechanisms, comprising a fluid operated trigger actuating means for each firearm, a general fluid circuit including a control valve, means connecting each of said trigger actuating means with said general fluid circuit, a valve interposed in each of said connecting means selectively to permit or prevent flow of fluid between said general fluid circuit and respective trigger actuating means, a manually movable control handle for each gun, operating means on said handle to open the respective interposed valve in one position only of the handle, safety mechanism operating means for each of said firearms including a movable member adjacent the respective control handle, means secured to said handle relatively to said movable member to engage said member and actuate said operating means to retract the safety lock when the said handle is moved to open the said interposed valve, recocking mechanism operating means for each of said firearms including a movable controlling part adjacent the respective control handle, and further means secured to said handle relative to said movable part to engage the part and actuate the recocking mechanism operating means when said handle is moved to the position to close the said interposed valve and to apply the safety lock.

13. A device for controlling from a remote station a plurality of machine guns having safety locks and recocking mechanisms, comprising a plurality of handles at the station, each for a unit of at least one gun and adapted to assume a safety position, a recocking position at one side of same and a fire selecting position at the other side of same, connections for operating said recocking mechanisms, control devices at the station in said connections and adapted to be so controlled by the respective handles that said mechanisms are caused to recock the gun units when the respective handles are in recocking position, other connections for operating said safety locks, control devices at the station in said other connections and adapted to be so operated by the respective handles that said safety locks are retracted in gun units as the respective handles pass from safety position into fire selecting position, a general firing device at the station, operating connections from said firing device to the gun triggers, and selectors in the last said connections and adapted to be so controlled by said handles that the last said connections to gun units are made operative in fire selecting position of the respective handles, thereby to select for being fired upon actuation of said firing device the gun units in which the safety locks have been retracted and which are not being recocked.

14. Selective remote control means for a plurality of machine guns having safety locks and recocking mechanisms, comprising a plurality of unitary control handles each for a unit of at least one machine gun, means operable by each handle for retracting the safety lock of the respective gun unit, means also operable by each handle for recocking the respective gun unit, further means operable by each handle to prevent the respective gun unit from firing until the safety lock has been retracted and also to prevent firing of the unit during recocking, and a main firing device operable to fire all the units, said further means connecting the firing mechanism of the respective unit with said firing device and permitting the firing of the respective unit only when the gun is not being recocked and only after the safety lock has been retracted.

15. A device for controlling from a remote station a plurality of machine gun units having respectively two mechanisms intended to operate preparatory to firing, comprising a plurality of handles at the station, each for a gun unit and adapted to assume two extreme positions and an intermediate position, connections for operating the first of said mechanisms in each gun unit, control devices at the station for said connections and adapted to be so controlled by said handles that said first mechanisms are caused to operate in gun units when the respective handles are in one of said extreme positions, connections for operating the second of said mechanisms in each gun unit, control devices at the station for the last said connections and adapted to be so controlled by said handles that said second mechanisms in gun units are caused to operate as the respective handles pass from intermediate position to the other extreme position, a general firing device at the station, operating connections from said device to the gun triggers, and selectors in the last said connections and adapted to be so controlled by said handles that the last said connections to gun units are made operative in said other extreme position of the respective handles, thereby to select for being fired upon actuation of said firing device the gun units in which said first mechanisms are not operating and said second mechanisms have operated.

16. A device for controlling from a remote station a plurality of machine gun units having recocking mechanisms, comprising a plurality of handles at the station, each for a gun unit and adapted to assume a recocking position, a fire selecting position and a position of rest intermediate said recocking and fire selecting positions, connections for operating said recocking mechanisms, control devices at the station for said connections and adapted to be so controlled by said handles that said mechanisms are caused to recock the gun units when the respective handles are in recocking position, a general firing device at the station, operating connections from said firing device to the gun triggers, and selectors in the last said connections and adapted to be so controlled by said handles that the last said connections to gun units are made operative in fire selecting position of the respective handles, thereby to select for being fired upon actuation of said firing device the gun units which are not being recocked and to allow other gun units to be neither so selected nor being recocked.

17. A device for controlling from a remote station a plurality of machine gun units having fluid pressure mechanisms intended to operate preparatory to firing, comprising a plurality of handles at the station, each for a gun unit and adapted to assume two extreme positions and an intermediate position, conduits for feeding said mechanisms, valves at the station in said conduits and adapted to be so controlled by said handles that said mechanisms are caused to operate in gun units when the respective handles are in one of said extreme positions, a general firing device at the station, operating connections from said device to the gun triggers, and selectors in the last said connections and adapted to be so controlled by said handles that said connections to gun units are made operative in the other extreme position of the respective handles, thereby to select for being fired upon actuation of said firing device the gun units in which said mechanisms are not operating and to allow other gun units neither to be so selected nor to have their said mechanisms operating.

18. A device for controlling from a remote station a plurality of machine gun units having fluid pressure trigger servo-motors and safety locks, comprising a plurality of handles at the station, each for controlling a gun unit and adapted to assume a safety position and a fire selecting position, connections for operating said safety locks, control devices at the station for said connections and adapted to be so controlled by said handles that the safety locks in gun units are retracted as the respective handles pass from safety position to fire selecting position, a main conduit at the station for feeding the trigger servo-motors, a general firing valve in said conduit, branch conduits from said main conduit to said servo-motors, and selecting valves at the station in said branch conduits and adapted to be so controlled by said handles that the branch conduits to gun units are opened when the respective handles are in fire selecting position, thereby to select for being fired upon opening the general firing valve the gun units in which the safety locks have been retracted.

19. A device for controlling from a remote station a plurality of gun units having fluid pressure trigger servo-motors and mechanisms intended to operate preparatory to firing, comprising a plurality of handles at the station, each for controlling a gun unit and adapted to assume an unprepared position and a fire selecting position, connections for operating said mechanisms, control devices at the station for said connections and adapted to be so controlled by said handles that said mechanisms are caused to operate in gun units as the respective handles pass from unprepared position to fire selecting position, a main conduit at the station for feeding the trigger servo-motors, a general firing valve in said conduit, branch conduits from the latter to said servo-motors, and selecting valves in said branch conduits and adapted to be so controlled by said handles that the branch conduits to gun units are opened when the respective handles are in fire selecting position, thereby to select for being fired upon opening the general firing valve the gun units in which said mechanisms have operated.

ANDRÉ BOUSSEL.